United States Patent
Hirata et al.

(10) Patent No.: US 8,862,789 B2
(45) Date of Patent: Oct. 14, 2014

(54) COMMUNICATION CONTROL DEVICE

(75) Inventors: Yoichi Hirata, Osaka (JP); Toru Hino, Osaka (JP); Takeshi Saeki, Osaka (JP); Kazuyuki Murakami, Osaka (JP); Mitsuru Kashihara, Osaka (JP); Hironori Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 12/961,503

(22) Filed: Dec. 7, 2010

(65) Prior Publication Data
US 2011/0138084 A1 Jun. 9, 2011

(30) Foreign Application Priority Data
Dec. 8, 2009 (JP) ................................ 2009-278120

(51) Int. Cl.
*G06F 13/00* (2006.01)
*G06F 3/06* (2006.01)
*G06F 15/177* (2006.01)
*G06F 11/30* (2006.01)
*G06F 12/06* (2006.01)

(52) U.S. Cl.
CPC ............ *G06F 3/0659* (2013.01); *G06F 15/177* (2013.01); *G06F 11/3065* (2013.01); *G06F 12/0646* (2013.01)
USPC .......................................................... 710/10

(58) Field of Classification Search
None
See application file for complete search history.

(56) References Cited

U.S. PATENT DOCUMENTS

| 7,711,865 | B2 | 5/2010 | Kim et al. |
| 7,813,913 | B2 | 10/2010 | Collins et al. |
| 8,001,303 | B2 * | 8/2011 | Brundridge et al. ............ 710/74 |
| 8,612,653 | B2 | 12/2013 | Nitta et al. |
| 2006/0279642 | A1 * | 12/2006 | Yoneda ...................... 348/231.1 |
| 2007/0083354 | A1 | 4/2007 | Collins et al. |
| 2007/0162949 | A1 | 7/2007 | Nitta et al. |
| 2009/0144469 | A1 | 6/2009 | Brundridge et al. |
| 2011/0004459 | A1 * | 1/2011 | Collins et al. .................... 703/24 |

FOREIGN PATENT DOCUMENTS

| JP | 2002-215275 A | 7/2002 |
| JP | 2002-324040 A | 11/2002 |
| JP | 2002-359810 A | 12/2002 |

(Continued)

OTHER PUBLICATIONS
Non-final Office Action for the related U.S. Appl. No. 13/802,116, issued Sep. 18, 2013.

(Continued)

*Primary Examiner* — Idriss N Alrobaye
*Assistant Examiner* — Richard B Franklin
(74) *Attorney, Agent, or Firm* — Shinjyu Global IP

(57) ABSTRACT

An electronic device comprises a plurality of memory components, a connector, a receiver, and a communication component. The connector is configured to operatively connect the electronic device to an external device. The external device is capable of individually recognizing the memory components one at a time or simultaneously recognizing only a few of the memory components. The receiver is configured to receive a select instruction that specifies which of the memory components will be recognized by the external device. The communication component is configured to automatically communicate with the external device to permit the external device to automatically recognize at least one of the memory components as a predefined memory component. The communication component is further configured to communicate with the external device when the receiver receives the select instruction to permit the external device to recognize at least one memory components according to the select instruction.

14 Claims, 13 Drawing Sheets

(56) References Cited

FOREIGN PATENT DOCUMENTS

| | | |
|---|---|---|
| JP | 2005-107875 A | 4/2005 |
| JP | 2006-202234 A | 8/2006 |
| JP | 2007-180764 A | 7/2007 |
| JP | 2009-512033 A | 3/2009 |

OTHER PUBLICATIONS

Panasonic Operating Instructions High Definition Video Camera Model No. HDC-TM300P/PC HDC-HS300P/PC; 2009; Panasonic Corporation; pp. 1-172.

Martin Borve, *How Does USB Stack Enumerate a Device?*, USB Core Team Blog, Oct. 30, 2009.

* cited by examiner

COMMUNICATION CONTROL DEVICE

CROSS-REFERENCE TO RELATED APPLICATIONS

This application claims priority to Japanese Patent Application No. 2009-278120, filed on Dec. 8, 2009. The entire disclosure of Japanese Patent Application No. 2009-278120 is hereby incorporated herein by reference.

BACKGROUND

1. Field of the Invention

The present invention relates to an electronic device. More specifically, the present invention relates to an electronic device that allows connection with an external device.

2. Background Information

Japanese Patent Application No. 2006-202234 discloses a USB switching device that controls the switching of a USB communication path. This USB switching device switches between a digital still camera (DSC)-printer connection state and a DSC-storage device connection state, on the basis of a switching signal from a storage device.

SUMMARY

It has been discovered that if the user tries to make a USB connection between a DSC and an external device, e.g., a printer or a storage device, using the device disclosed in Japanese Patent Application No. 2006-202234 above, the operation remains problematic.

In view of the state of the known technology, one object of the present invention is to provide an electronic device in which connection to an external device can be accomplished by a relatively simple operation.

In order to achieve the above object of the present invention, an electronic device is provided comprising a plurality of memory components, a connector, a receiver, and a communication component. The connector is configured to operatively connect the electronic device to a first external device. The first external device is capable of individually recognizing the plurality of memory components one at a time or simultaneously recognizing only a few of the plurality of memory components. The receiver is configured to receive a select instruction that specifies which of the memory components will be recognized by the first external device. The communication component is configured to automatically communicate with the first external device to permit the first external device to automatically recognize at least one of the memory components as a predefined memory component. The communication component is further configured to communicate with the first external device when the receiver receives the select instruction to permit the first external device to recognize at least one memory component according to the select instruction.

These and other objects, features, aspects and advantages of the present invention will become apparent to those skilled in the art from the following detailed description, which, taken in conjunction with the annexed drawings, discloses embodiments of the present invention.

DETAILED DESCRIPTION OF THE EMBODIMENTS

Embodiment 1

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

An example of applying the present invention to a digital video camera will now be described through reference to the drawings.

1-1. Overview

The digital video camera 100 pertaining to this embodiment has a USB (universal serial bus) 290. The digital video camera 100 can be connected via the USB 290 to various kinds of external device, such as a personal computer or a DVD (digital versatile disc) recorder.

The user can connect the digital video camera 100 with a personal computer, a DVD recorder, or another such external device by a relatively simple operation.

1-2. Configuration

1-2-1. Configuration of Entire System

Figure 1:
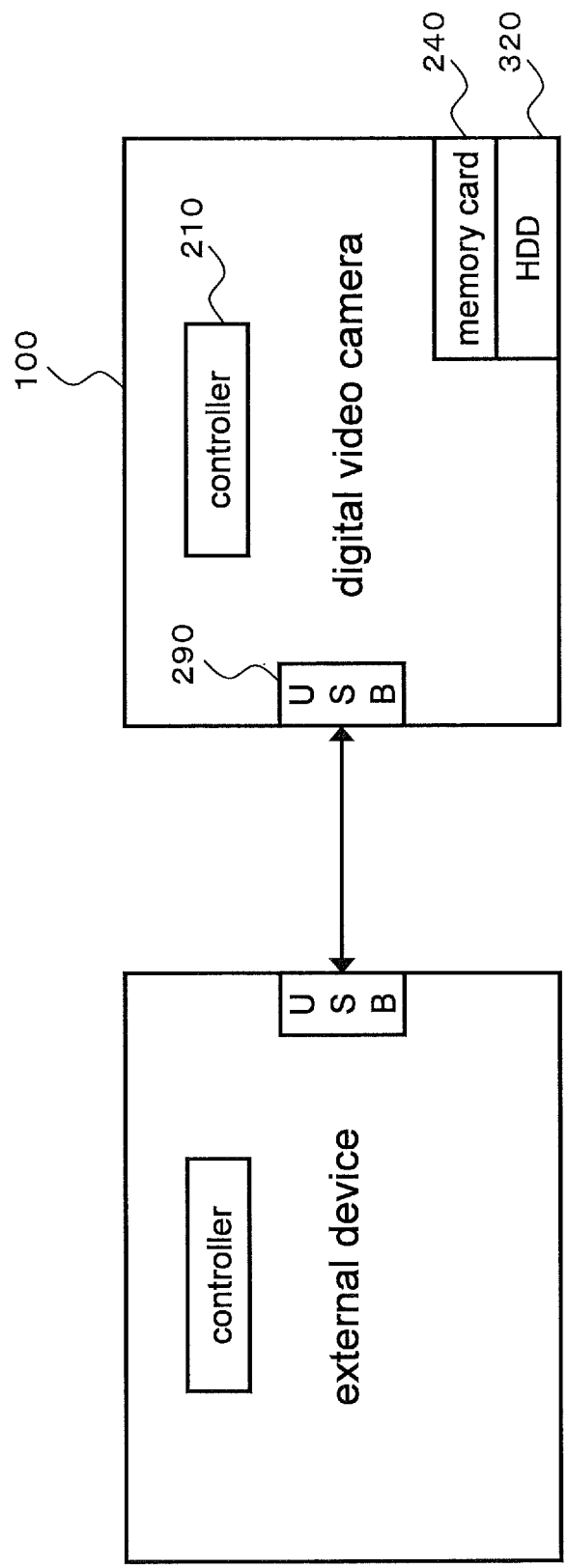
FIG. 1 is a block diagram of a system including a digital video camera and an external device.

As shown in FIG. 1, the digital video camera 100 pertaining to this embodiment is connected via the USB 290 to an external device to configure an entire system. With this system, the external device can access a HDD (hard disk drive) 320 and/or a memory card 240 within the digital video camera 100.

1-2-2. Configuration of Digital Video Camera

Figure 2:
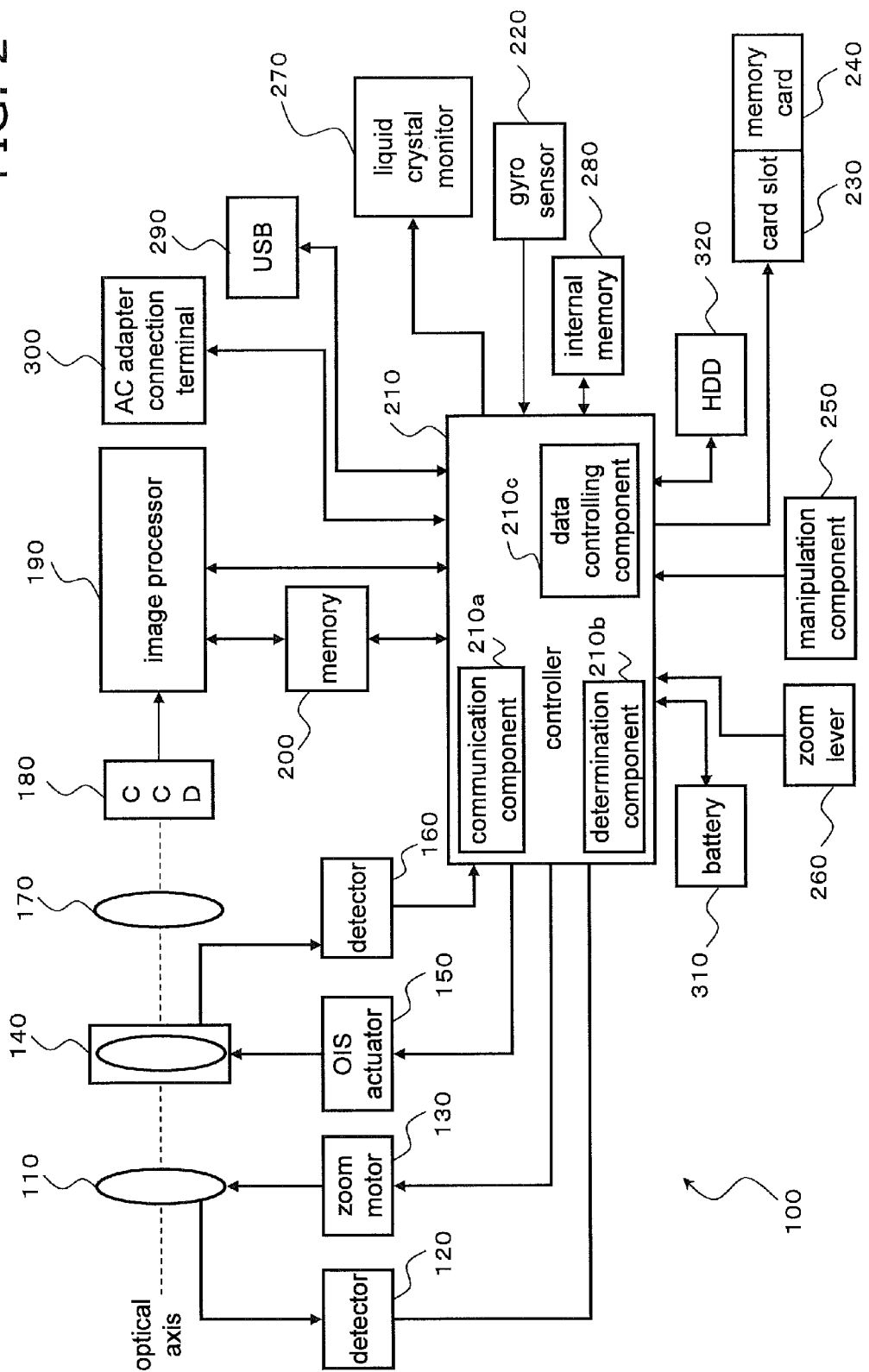
FIG. 2 is a block diagram illustrating the configuration of the digital video camera.

The electrical configuration of the digital video camera 100 pertaining to this embodiment will be described through reference to FIG. 2. FIG. 2 is a block diagram illustrating the configuration of the digital video camera 100. The digital video camera 100 uses a CCD image sensor 180 to capture an image of a subject formed by an optical system composed of a zoom lens 110, etc. The image data produced by the CCD image sensor 180 is subjected to various processing by an image processor 190 and stored in the HDD 320 and/or the memory card 240. The image data stored in the HDD 320 and/or the memory card 240 can be displayed on a liquid crystal monitor 270. The configuration of the digital video camera 100 will now be described in detail.

The optical system of the digital video camera 100 includes the zoom lens 110, an Optical Image Stabilizer (OIS) 140, and a focus lens 170. The zoom lens 110 can enlarge or reduce a subject image by moving along the optical axis of the optical system. The focus lens 170 adjusts the focus of the subject image by moving along the optical axis of the optical system.

The OIS 140 has an internal correction lens that can move within a plane perpendicular to the optical axis. The OIS 140 stabilizes the subject image by driving the correction lens in a direction that cancels out shake of the digital video camera 100.

A zoom motor 130 drives the zoom lens 110. The zoom motor 130 may be a pulse motor, a DC motor, a linear motor, a servo motor, or the like. The zoom motor 130 may drive the zoom lens 110 via a cam mechanism, a ball screw, or another such mechanism. A detector 120 detects the position where the zoom lens 110 is located on the optical axis. The detector 120 outputs a signal related to the position of the zoom lens by means of a brush or other such switch according to the amount of movement of the zoom lens 110 in the optical axis direction.

An OIS actuator 150 drives and moves the correcting lens inside the OIS 140 within a plane that is perpendicular to the optical axis. The OIS actuator 150 can be a plane coil, an ultrasonic motor, or the like. A detector 160 detects the amount of movement of the correcting lens inside the OIS 140.

The CCD image sensor 180 produces image data by capturing a subject image formed by the optical system composed of the zoom lens 110, etc. The CCD image sensor 180 performs exposure, transfer, electronic shuttering, and various other such operations.

The image processor 190 subjects the image data produced by the CCD image sensor 180 to various processing and thereby produce image data for display on the liquid crystal monitor 270, or produces image data to be re-stored in the HDD 320 and/or the memory card 240. For example, the image processor 190 subjects the image data produced by the CCD image sensor 180 to gamma correction, white balance correction, scratch correction, and various other such processing. The image processor 190 also compresses the image data produced by the CCD image sensor 180, using a compression format that conforms to the MPEG2 standard, the H.246 standard, or the like. The image processor 190 can be a DSP, a microprocessor, or the like.

A controller 210 is a control unit that controls the entire digital video camera 100. The controller 210 can be a semiconductor element or the like. The controller 210 may be constituted by hardware alone, or a combination of hardware and software. In this embodiment, the controller 210 is a microprocessor. The controller 210 reads and executes control programs held in an internal memory 280, and thereby operates as a communication component 210a, a determination component 210b, a data controlling component 210c, etc., to control, for example, the liquid crystal monitor 270 and other devices in the digital video camera 100. The operation of the communication component 210a, the determination component 210b, and the data controlling component 210c will be described in detail below.

A memory 200 functions as a working memory for the image processor 190 and the controller 210. The memory 200 is a DRAM, a ferroelectric memory, or the like, for example.

The liquid crystal monitor 270 is able to display an image corresponding to the image data produced by the CCD image sensor 180, an image corresponding to the image data read out from the HDD 320 and/or the memory card 240, etc. In another embodiment, an organic EL display, a plasma display, or another such display capable of displaying images can be used in place of the liquid crystal monitor 270.

A gyro sensor 220 has a piezoelectric element or another such vibrating material. The gyro sensor 220 obtains angular velocity information by converting the Coriolis force exerted on the vibrating material, which is vibrated at a specific frequency, into voltage. The controller 210 obtains angular velocity information from the gyro sensor 220. The controller 210 corrects any effect of shaking of the user's hand by driving the correcting lens inside the OIS 140 in the direction of canceling out the shake indicated by the angular velocity information.

The memory card 240 can be inserted into and removed from a card slot 230. The card slot 230 can be mechanically and electrically connected to the memory card 240. The memory card 240 includes an internal flash memory, ferroelectric memory, etc. The memory card 240 is a storage medium that records video data and so forth captured by the digital video camera 100.

The internal memory 280 can be a flash memory, ferroelectric memory, or the like. The internal memory 280 holds control programs and so forth for controlling the entire digital video camera 100.

A manipulation member 250 is an operating interface that receives image capture commands and other various commands from the user. A zoom lever 260 receives zoom ratio change commands from the user.

The USB 290 is an interface for connecting the digital video camera 100 with a personal computer or other such external device. For example, the USB 290 and the USB of a personal computer or other such external device can be connected via a USB cable. The digital video camera 100 can send and receive data to and from an external device, and can receive power supply from an external device, via the USB 290.

An AC adapter connection terminal 300 is an interface for connecting the digital video camera 100 to an AC adapter. The digital video camera 100 can receive power supply from an AC adapter via the AC adapter connection terminal 300.

A battery 310 is a chargeable battery for supplying power to the digital video camera 100.

The HDD 320 is a storage medium that is incorporated into the main body of the digital video camera 100. The HDD 320 is a storage medium that records video data and/or the like captured by the digital video camera 100.

1-2-3. Correspondence to Elements of the Embodiments

The memory card 240 and the HDD 320 are examples of memory components of the present invention. A DVD recorder is one example of a first external device. A personal computer is an example of a second external device. The USB 290 is one example of a connector. The manipulation member 250 is one example of a receiver. The communication component 210a of the controller 210 is an example of a communication component. The determination component 210b of the controller 210 is one example of a determination component. The data controlling component 210c of the controller 210 is one example of a data controlling component 210c. The liquid crystal monitor 270 is one example of a display component. The CCD image sensor 180 is one example of an imaging element.

1-3. Operation

The various operations of the digital video camera 100 pertaining to this embodiment will be described through reference to the drawings.

Figure 3:
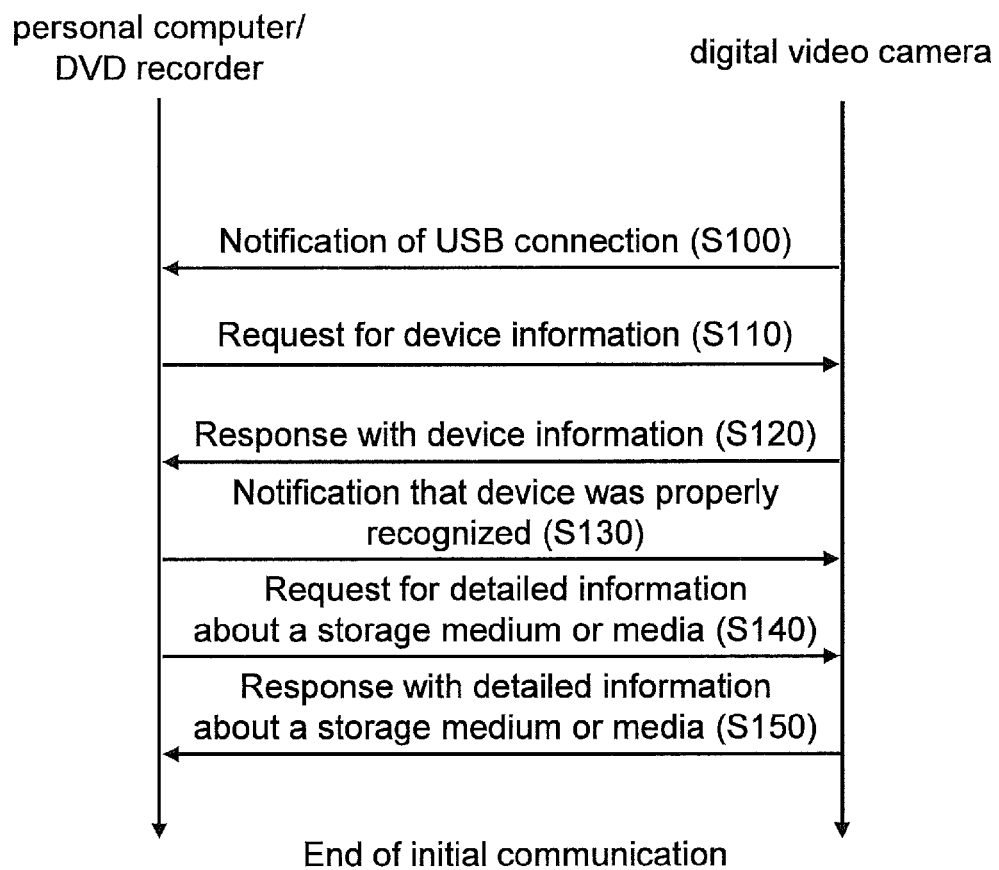
FIG. 3 is a sequence diagram illustrating the flow of initial communication.

1-3-1. Initial Communication Between External Device and Digital Video Camera The initial communication between the digital video camera 100 and a personal computer, DVD recorder, or other such external device will be described through reference to FIG. 3. FIG. 3 is a sequence diagram illustrating the flow of the initial communication.

The user can connect the digital video camera 100 to an external device via the USB 290. Once an external device is connected to the USB 290, the communication component 210a of the digital video camera 100 notifies the external device that a USB connection has been made (S100).

Upon receipt of a notification that a USB connection has been made, the external device requests device information about the digital video camera 100 from the communication component 210a (S110). The device information here is information related to the name of the device, the number and types of storage media included in the device, and so on.

Upon receipt of the request for device information, the communication component 210a responds to the external device with the requested device information (S120). Upon receipt of this response, the external device notifies the communication component 210a that the device information has been properly received, that is, that the digital video camera 100 has been properly recognized (S130).

After the notification of the proper receipt of device information, the external device requests detailed information about one or more of all the storage media included in the digital video camera 100 from the communication component 210a (S140). The detailed information about a storage medium here is information related to the capacity of the storage medium, the number of blocks of the storage medium, and so on. A personal computer requests detailed information about all the storage media included in the digital video camera 100. A DVD recorder, on the other hand, requests detailed information about only a predetermined storage medium (default storage medium) out of all the storage media included in the digital video camera 100.

Upon receipt of a request for detailed information about a storage medium or media, the communication component 210a responds to the external device with the requested detailed information (S150). As a result, a personal computer becomes in a state in which it recognizes all the storage media included in the digital video camera 100. On the other hand, a DVD recorder becomes in a state in which it recognizes only a predetermined storage medium out of all the storage media included in the digital video camera 100.

With the above operation, the initial communication between the external device and the digital video camera 100 is completed. This completion of initial communication establishes communication between the digital video camera 100 and the external device via the USB 290. More specifically, completion of initial communication establishes communication between the digital video camera 100 and a personal computer in a state in which both of the two storage media (the memory card 240 and the HDD 320) of the digital video camera 100 are recognized. Meanwhile, completion of initial communication establishes communication between the digital video camera 100 and a DVD recorder in a state in which one of the two storage media (the memory card 240 and the HDD 320) of the digital video camera 100 is recognized.

This initial communication is automatically begun once an external device is connected to the USB 290. Therefore, the above-mentioned communication is automatically established once the user connects an external device to the USB 290 of the digital video camera 100.

The operation after completion of initial communication will now be described.

1-3-2. Startup Operation of Application Software in External Device

Figure 4:
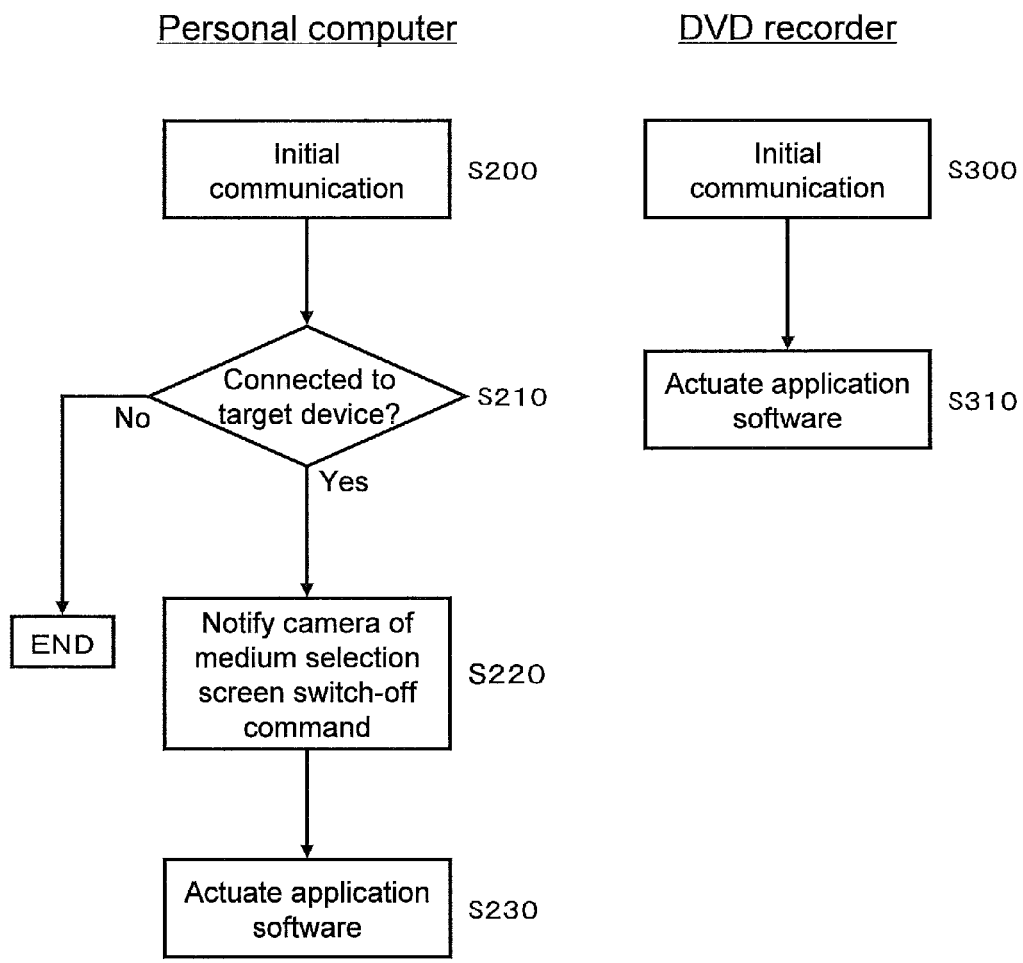
FIG. 4 is a flowchart illustrating the startup operation of application software.

The operation of the external device after the completion of initial communication between the external device and the digital video camera 100 will be described through reference to FIG. 4. FIG. 4 is a flowchart illustrating the startup operation of application software in an external device. The external device is in a state in which it is connected to the digital video camera 100 via the USB 290. Here, a personal computer and a DVD recorder will be used as examples of external devices.

First, the operation of the personal computer will be described. Application software and resident software corresponding to the digital video camera 100 have been installed in this personal computer ahead of time. Resident software is software that causes the personal computer to execute processing for monitoring the connection of a device to the personal computer. Resident software is automatically started up once a device is connected to the personal computer. Application software is software that causes the personal computer to execute processing such as the editing of moving pictures and/or still pictures outputted from the digital video camera 100 to the personal computer.

The resident software (more precisely, the controller of the personal computer that executes resident software, the same shall apply hereinafter) executes initial communication with the device connected to the personal computer (S200). If the device connected to the personal computer is the digital video camera 100, the initial communication shown in FIG. 3 is executed.

Upon completion of this initial communication (S200), the resident software in the personal computer determines whether or not the device connected to the personal computer is a target device (S210). The "target device" here is a device that has been recognized ahead of time by the resident software to be a device to which the resident software can start up the application software. The resident software recognizes the digital video camera 100 as a target device ahead of time.

If the device is determined not to be a target device, the resident software ends the operation.

On the other hand, if the device is determined to be a target device, the resident software sends the digital video camera 100 a medium selection screen switch-off command (S220). The "medium selection screen switch-off command" here is a command to switch off the medium selection screen (discussed below) from the liquid crystal monitor 270. Upon sending of a medium selection screen switch-off command to the digital video camera 100, the resident software starts up the application software (S230).

Next, the operation of the DVD recorder will be described. The controller of the DVD recorder automatically executes the initial communication shown in FIG. 3 once the digital video camera 100 is connected to the DVD recorder. Upon completion of the initial communication (S300), the DVD recorder immediately starts up the application software (S310). This application software is software that causes the DVD recorder to execute moving picture and/or still picture recording, reproduction, or other such processing.

1-3-3. Operation of Determining Storage Media of Digital Video Camera

Figure 5:
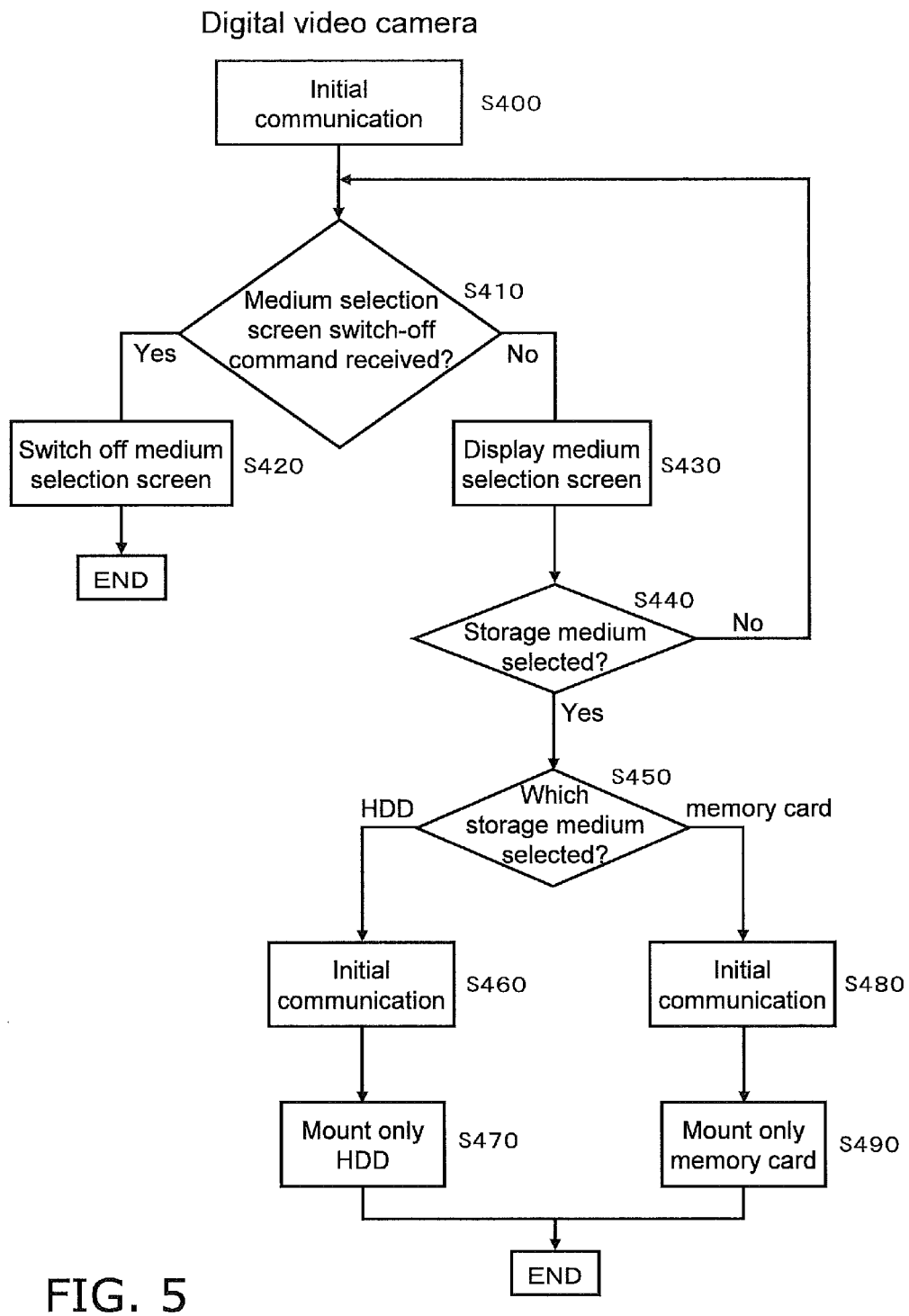
FIG. 5 is a flowchart illustrating the decision operation of a memory medium.

The operation of the digital video camera 100 after completion of initial communication between the external device and the digital video camera 100 will be described through reference to FIG. 5. FIG. 5 is a flowchart illustrating the decision operation of the storage media of the digital video camera 100. The processing in FIG. 5 performed by the digital video camera 100 is executed in parallel with the processing in FIG. 4 performed by the external device. The decision operation of the storage media of the digital video camera 100 is automatically executed once an external device is connected to the USB 290.

Figure 6B:
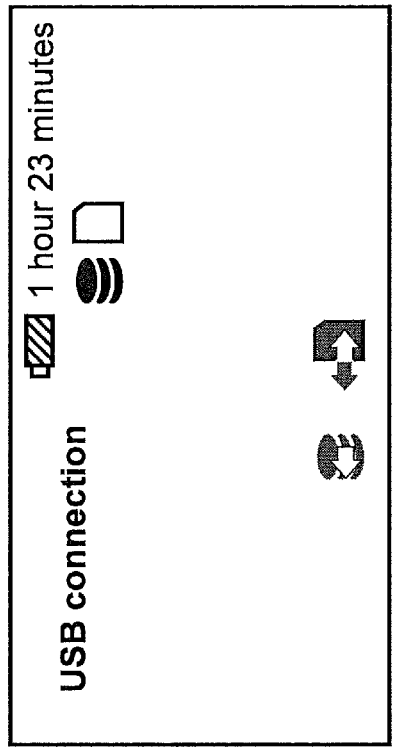
FIG. 6B is a diagram of a screen displayed on a liquid crystal monitor after completion of initial communication.
Figure 6A:
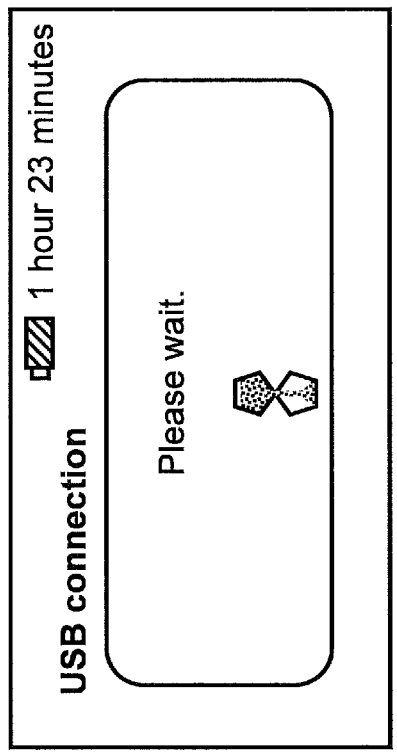
FIG. 6A is a diagram of a screen displayed on a liquid crystal monitor during initial communication.

Upon completion of the initial communication (S400) shown in FIG. 3, the determination component 210b of the controller 210 determines whether or not a medium selection screen switch-off command has been received from the external device (S410). During initial communication, the controller 210 displays the screen of FIG. 6A on the liquid crystal monitor 270. After completion of the initial communication, the controller 210 instructs the liquid crystal monitor 270 to display the screen illustrated in FIG. 6B. The screen displays the medium selection screen illustrated in FIGS. 7, 12 and 13, which is generated when the controller 210 received information from the internal memory 280.

If it is determined that a medium selection screen switch-off command has been received, the controller 210 executes step S420. If a medium selection screen (discussed below) is being displayed on the liquid crystal monitor 270, the controller 210 controls the liquid crystal monitor 270 so as to switch off the medium selection screen (S420). On the other hand, if a medium selection screen is not being displayed on the liquid crystal monitor 270, the controller 210 does nothing (S420). The liquid crystal monitor 270 displays the screen of FIG. 6B at the point when step S420 comes to an end.

Figure 7:
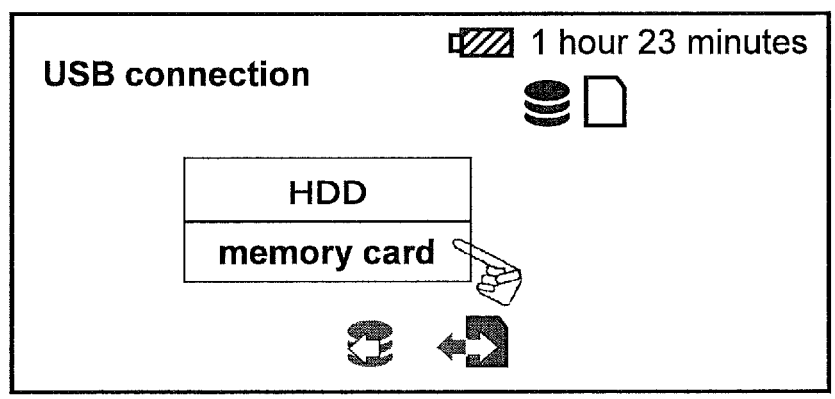
FIG. 7 is a diagram of a medium selection screen.

Meanwhile, if it is determined that no medium selection screen switch-off command has been received, the controller 210 controls the liquid crystal monitor 270 so that the medium selection screen of FIG. 7 is displayed (S430). The medium selection screen is a screen that allows the user to input a select instruction and thereby allows the user to select which of the two storage media (the memory card 240 and the HDD 320) of the digital video camera 100 is to be recognized by the external device. The select instruction is an instruction with which the user shows the digital video camera 100 which of the plurality of memory components are to be recognized by the external device. In other words, the medium selection screen prompts the user to select either the memory card 240 or the HDD 320 as the storage medium to be recognized by the external device. That is, the medium selection screen asks the user to select either the memory card 240 or the HDD 320 as the storage medium that the external device is to recognize.

After step S430, the controller 210 determines whether or not the user has selected a storage medium on the medium selection screen (S440). The user can select a storage medium on the medium selection screen by manipulating the manipulation member 250. The manipulation member 250 is a member that receives the select instruction from the user. The manipulation member 250 may be a button, or may be a touch panel provided to the liquid crystal monitor 270. In short, the manipulation member 250 may be any interface with which the controller 210 can be made to recognize the selection of a storage medium by the user. If it is determined that no storage medium has been selected, the controller 210 again performs the determination of step S410. On the other hand, if it is determined that a storage medium has been selected, the controller 210 determines which storage medium was selected by the user (S450).

If it is determined that the HDD 320 was selected, the digital video camera 100 and the external device again perform the initial communication of FIG. 3 (S460). At that time, if the DVD recorder is connected to the USB 290, the communication component 210a sends the DVD recorder detailed information about the HDD 320 in step S150, which is included in the initial communication. Therefore, when the initial communication (S460) is complete, the DVD recorder becomes in a state in which the HDD 320 of the digital video camera 100 has been mounted (recognized) (S470).

On the other hand, if it is determined that the memory card 240 was selected, the digital video camera 100 and the external device again perform the initial communication of FIG. 3 (S480). At that time, if the DVD recorder is connected to the USB 290, the communication component 210a sends the DVD recorder detailed information about the memory card 240 in step S150, which is included in the initial communication. Therefore, when the initial communication (S480) is complete, the DVD recorder becomes in a state in which the memory card 240 of the digital video camera 100 has been mounted (recognized) (S490).

The digital video camera 100 receives a medium selection screen switch-off command only when the digital video camera 100 is connected to a personal computer. That is, a medium selection screen switch-off command is a signal that causes the digital video camera 100 to recognize the type of external device (whether it is a personal computer or a DVD recorder) connected to the digital video camera 100. Therefore, the above-mentioned step S410 is a step of determining the type of external device connected to the digital video camera 100.

1-4. Data Controlling Component

The external device such as, for example, a personal computer or a DVD recorder, can read data from the memory card 240 and/or the HDD 320, whichever the external device is currently recognizing. The data controlling component 210c stores the image data recorded by the user in the memory card 240 and/or the HDD 320. The data controlling component 210 send the external device the data (including the image data) stored in the memory card 240 and/or the HDD 320 according to a command sent from the external device.

1-5. Features of Digital Video Camera

Once a DVD recorder is connected to the digital video camera 100, the digital video camera 100 automatically executes initial communication and causes the DVD recorder to recognize the default storage medium. The DVD recorder is a type of external device capable of simultaneously recognizing only some of the plurality of storage media of the digital video camera 100. Therefore, communication between the DVD recorder and the digital video camera 100 can be established in plug-and-play fashion, without requiring the user to go through a complicated operation.

Also, once a DVD recorder is connected to the digital video camera 100, the digital video camera 100 automatically displays a medium selection screen on the liquid crystal monitor 270 upon completion of the initial communication. The medium selection screen is a screen that receives an instruction from the user with which the storage medium to be recognized by the DVD recorder is selected from among the two storage media (the memory card 240 and the HDD 320) of the digital video camera 100. When the digital video camera 100 is instructed via the medium selection screen to change the storage medium, it executes initial communication again, and causes the DVD recorder to recognize the storage medium indicated by this instruction. Consequently, the user can easily have the DVD recorder recognize a storage medium other than the default storage medium.

Also, once a DVD recorder is connected to the digital video camera 100, the digital video camera 100 automatically executes initial communication to cause the DVD recorder to recognize the default storage medium, and automatically causes the liquid crystal monitor 270 to display the medium selection screen after completion of initial communication. Consequently, if the usage frequency of the default storage medium by the user is generally greater than the usage frequency of other storage media, in most cases the storage medium desired by the user will be recognized by the DVD recorder in plug-and-play fashion. Furthermore, if necessary, the user can select a storage medium other than the default storage medium with the medium selection screen. The default storage medium may be set to one with a storage capacity that is greater than that of other storage media, or may be set to one with a data read speed that is greater than that of other storage media, or may be set to one determined to be suitable on the basis of survey results, or can be set to any other storage medium.

Also, the medium selection screen is displayed on the liquid crystal monitor 270, which allows the user to visually understand the choices of the storage medium to be recognized by the external device. As a result, changing the storage medium to be recognized by the external device can be accomplished easily and intuitively.

Also, once a personal computer is connected to the digital video camera 100, the digital video camera 100 automatically executes initial communication. A personal computer is a type of external device capable of simultaneously recognizing all of the plurality of storage media included in the digital video camera 100. As a result, regardless of whether the user connects a personal computer or a DVD recorder to the digital video camera 100, communication between the digital video camera 100 and the external device can be automatically established in plug-and-play fashion. Consequently, the user can start communication between the digital video camera 100 and the external device automatically, merely by connecting the two, without going to the trouble of making a selection, etc.

Also, once a DVD recorder is connected to the digital video camera 100, the digital video camera 100 automatically displays a medium selection screen on the liquid crystal monitor 270, but when a personal computer is connected to the digital video camera 100, either a medium selection screen is not displayed on the liquid crystal monitor 270, or, if a medium selection screen is already being displayed on the liquid crystal monitor 270, it is switched off. The digital video camera 100 executes the different processing according to the type of external device which is connected to the digital video camera 100, so that the user does not need to do any unnecessary operations.

Other Embodiments

Embodiment 1 was described above as an embodiment of the present invention, but the present invention is not limited to or by these. Other embodiments of the present invention will be described in this section.

In Embodiment 1, a digital video camera was used as an example of an electronic device pertaining to the present invention, but the present invention can also be applied to other electronic devices having a plurality of storage media.

Also, in Embodiment 1, a hard disk drive and a memory card were given as examples of a plurality of storage media (or memory components), but the present invention is not necessarily limited to these examples. The present invention can be applied to an electronic device equipped with a flash memory, a hard disk drive, and a memory card, an electronic device equipped with two memory cards, or other various electronic devices having a plurality of media. In other words, in Embodiment 1 there were two storage media that the DVD recorder could recognize, and there was one default storage medium. In other embodiments, however, there may be three or more storage media that the DVD recorder can recognize. In this case, there may be two or more default storage media.

Also, in Embodiment 1 a medium selection screen switch-off command was sent from the personal computer to the digital video camera 100, but the present invention is not necessarily limited to such a situation. For instance, instead of a medium selection screen switch-off command, any command can be sent that can notify to the effect that an external device is able to simultaneously recognize all of the storage media of the digital video camera 100.

Also, in Embodiment 1 the USB 290 was given as an example of a connector, but the present invention is not necessarily limited to this. Any connector that allows bidirectional communication between the digital video camera 100 and an external device may be used.

Also, in Embodiment 1 a medium selection screen was automatically displayed on the liquid crystal monitor 270 once the DVD recorder was connected to the USB 290, but a medium selection screen does not necessarily have to be displayed in plug-and-play fashion. For example, the user may use the manipulation member 250 to direct that a medium selection screen be displayed at the desired timing.

Also, in Embodiment 1 a medium selection screen switch-off command was sent from the personal computer to the digital video camera 100 in order for the digital video camera 100 to recognize the type of external device connected to the digital video camera 100. However, the digital video camera 100 can recognize the type of external device connected to the digital video camera 100 in some other way.

Figure 8:
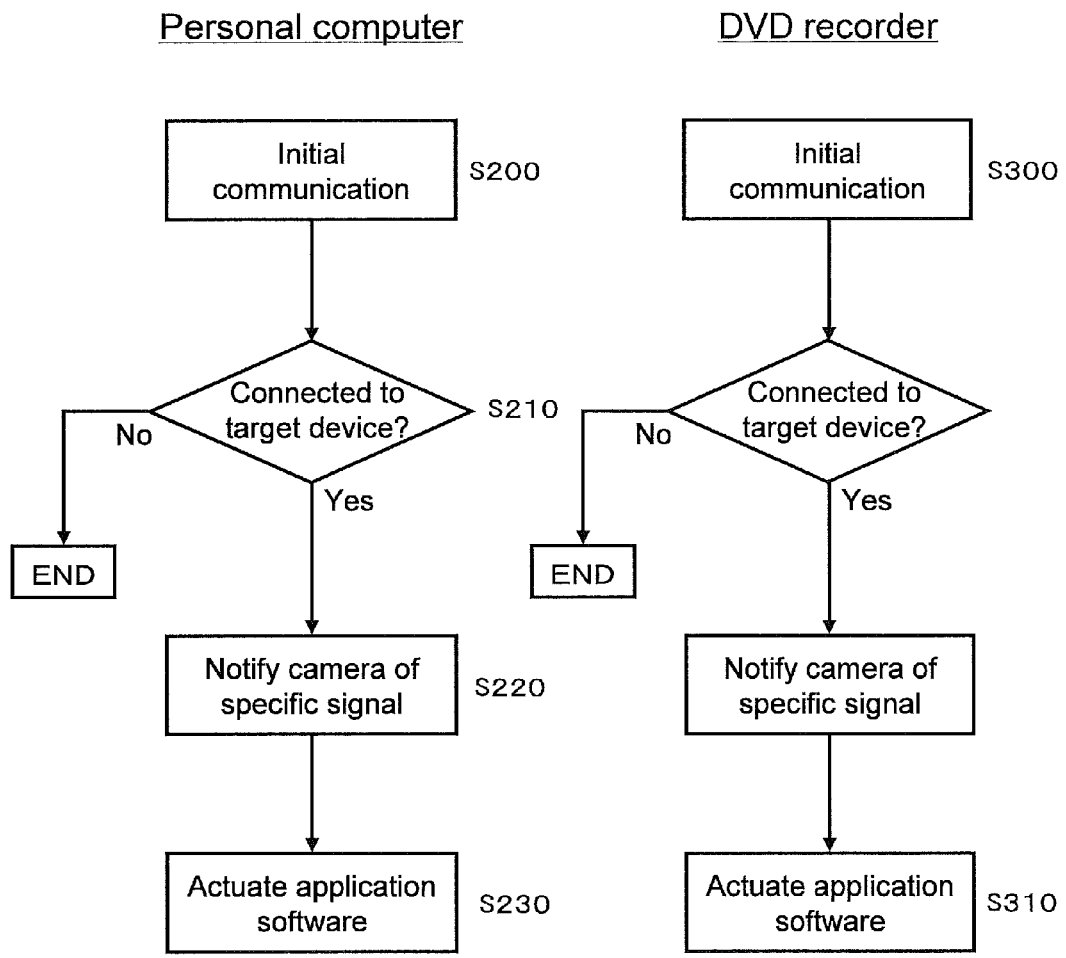
FIG. 8 is a flowchart illustrating the startup operation of application software pertaining to a modification example.
Figure 9:
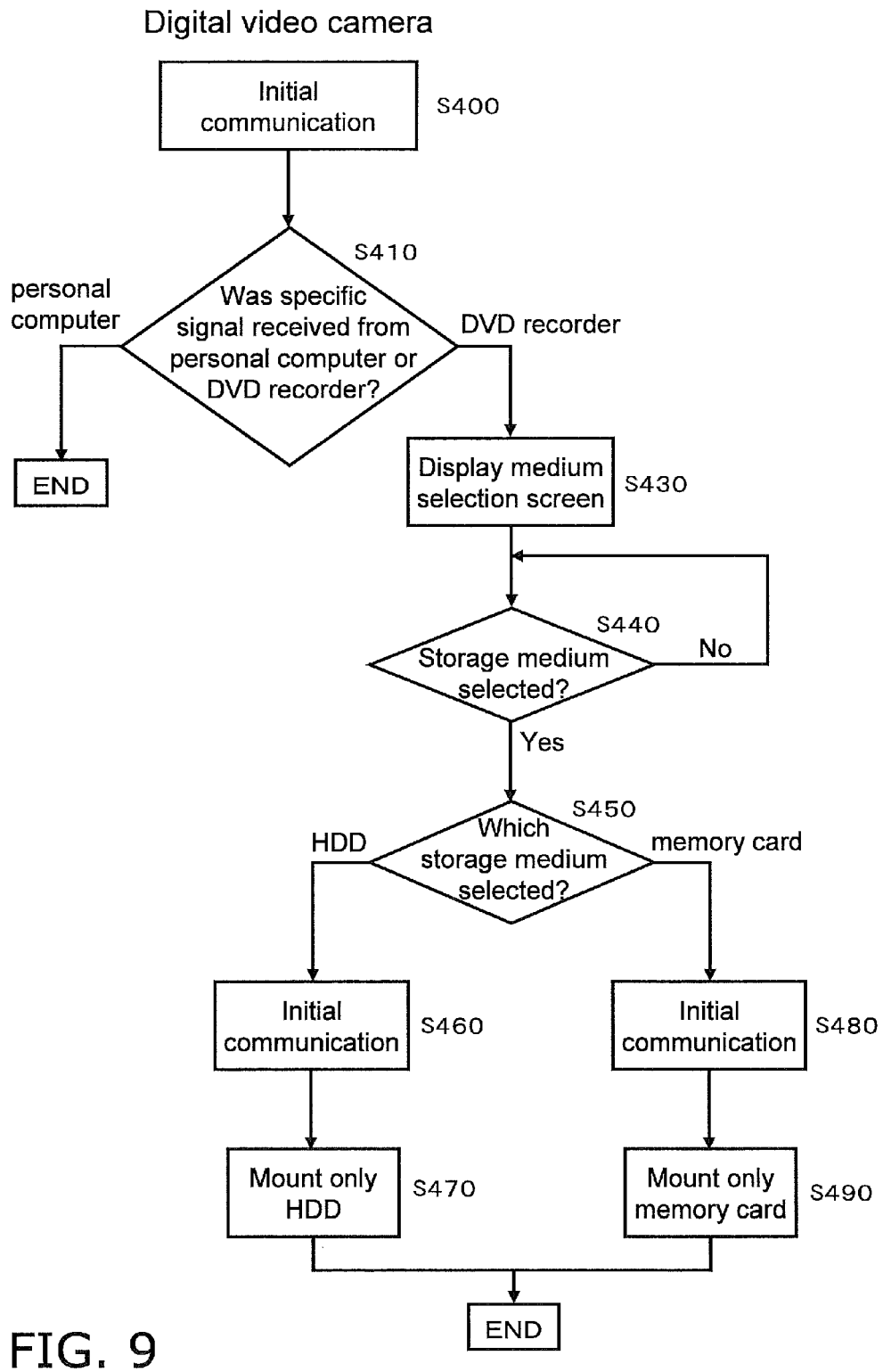
FIG. 9 is a flowchart illustrating the decision operation of a memory medium pertaining to a modification example.

For example, as shown in FIG. 8, both the personal computer and the DVD recorder may send the digital video camera 100 signals that allow the respective types to be identified. In this case, the processing of FIG. 5 can be modified to the processing of FIG. 9, for example. More specifically, in step S410, the processing is ended when a specific signal has been sent from the personal computer and the processing moves to step S430 when a specific signal has been sent from the DVD recorder. If a determination of "no" is made in step S440, the processing returns to step S440, rather than going to step S410.

Figure 10:
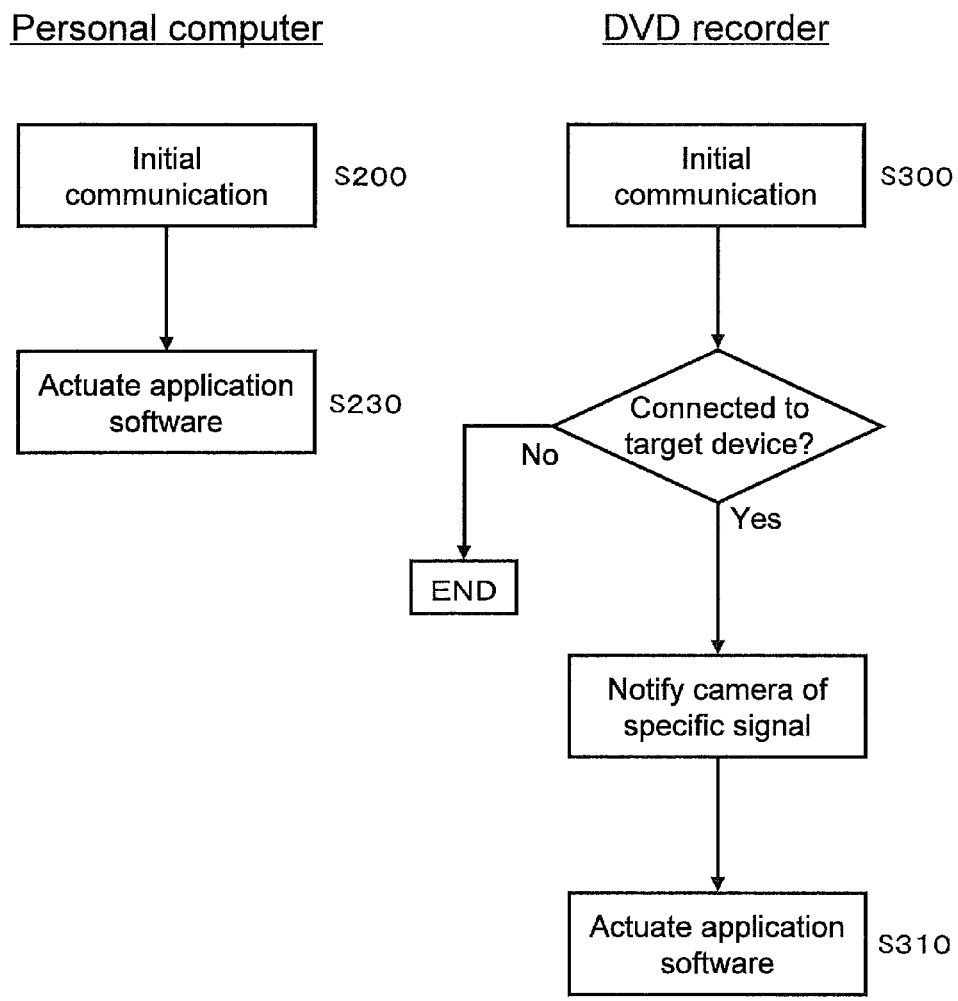
FIG. 10 is a flowchart illustrating the startup operation of application software pertaining to another modification example.
Figure 11:
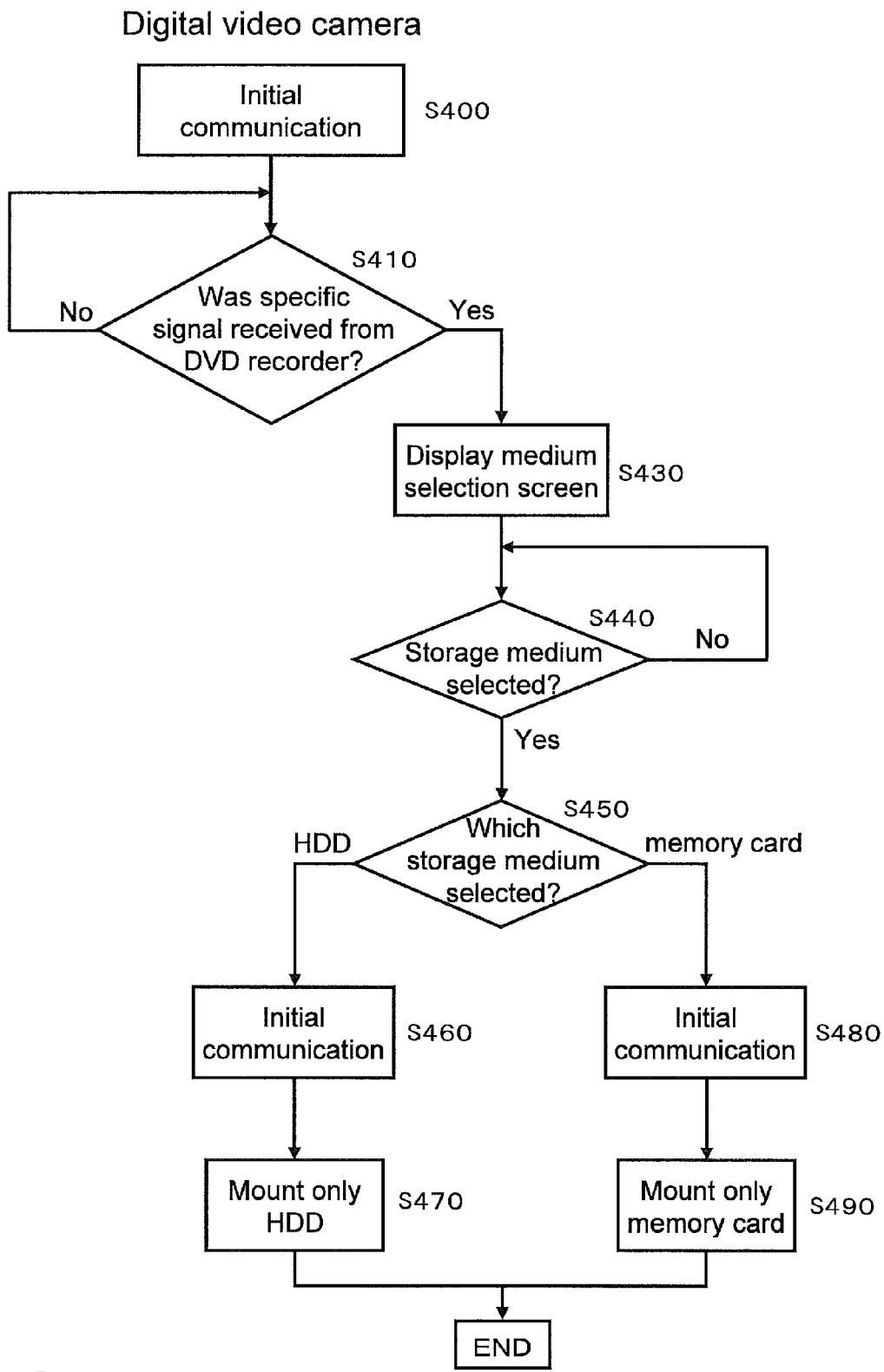
FIG. 11 is a flowchart illustrating the decision operation of a memory medium pertaining to another modification example.

Alternatively, as shown in FIG. 10, only the DVD recorder may send a specific signal to the digital video camera 100. In this case, the processing of FIG. 5 can be modified to the processing of FIG. 11, for example. More specifically, if a determination of "no" is made in step S410, step S410 is repeated. Furthermore, if a determination of "no" is made in step S440, the processing returns to step S440, rather than going to step S410.

As described above, if a specific signal is sent from the personal computer and/or the recorder, the determination component 210b is able to determine the type of external device connected to the digital video camera 100.

Figure 12:
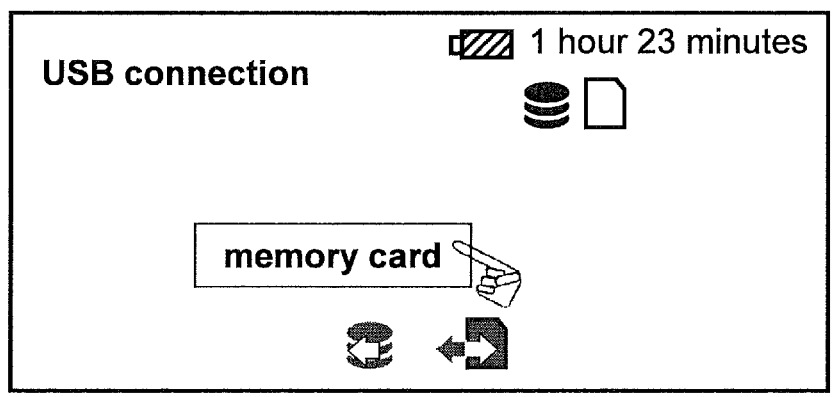
FIG. 12 is a diagram of a medium selection screen pertaining to a modification example.
Figure 13:
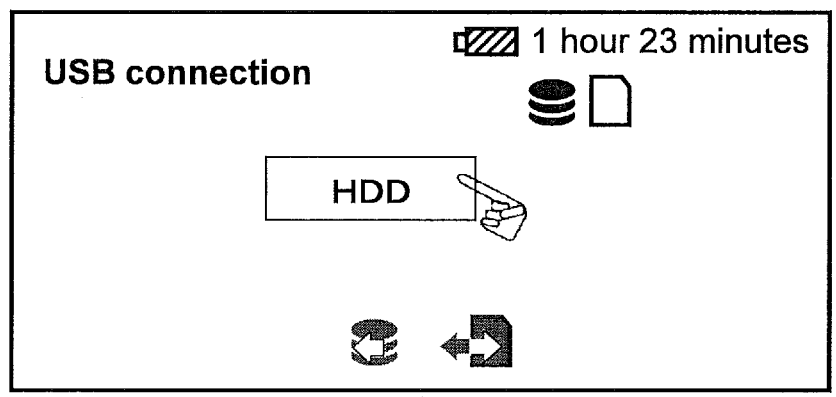
FIG. 13 is a diagram of a medium selection screen pertaining to a modification example.

Also, the medium selection screen is not limited to the example shown in FIG. 7, and may instead be as shown in FIG. 12 or 13, for example. That is, the medium selection screen need not be a screen on which all of the storage media included in the digital video camera 100 are given as options as shown in FIG. 7, and may instead be a screen on which the currently selected storage medium option is omitted as shown in FIGS. 12 and 13, and only options for the storage media not currently selected are given.

The screen in FIG. 12 is a screen that receives an instruction to change the storage medium to be recognized by the DVD recorder from the HDD 320 to the memory card 240 when the HDD 320 has been connected to the USB 290. If the user wants to select the HDD 320, he or she can make the selection to do nothing, but if the user wants to select the memory card 240, he or she can make the selection to press the icon for the memory card 240. Similarly, the screen in FIG. 13 is a screen that receives an instruction to change the storage medium to be recognized by the DVD recorder from the memory card 240 to the HDD 320 when the memory card 240 has been connected to the USB 290. If the user wants to select the memory card 240, he or she can make the selection to do nothing, but if the user wants to select the HDD 320, he or she can make the selection to press the icon for the HDD 320. That is, the medium selection screens shown in FIGS. 12 and 13 are screens that allow the user to select which of the two storage media (the memory card 240 and the HDD 320) of the digital video camera 100 is to be recognized by the external device.

Also, in Embodiment 1, a DVD recorder was given as an example of an external device (first external device) of a type capable of simultaneously recognizing only some of the plurality of storage media of the digital video camera 100, and a personal computer was given as an example of an external device (second external device) of a type capable of simultaneously recognizing all of the plurality of storage media of the digital video camera 100. However, the present invention is not limited to or by these examples. For instance, when USB connection is assumed, any device equipped with an OS (operating system) that can simultaneously recognize a plurality of logical units can be used as the second external device. Meanwhile, a device in which such an OS is not installed, and which is designed to be able to recognize only one logical unit at a time, can be used as the first external device.

INDUSTRIAL APPLICABILITY

The present invention can be applied to a digital video camera, a digital still camera, or other such electronic devices.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of an electronic device. Accordingly, these terms, as utilized to describe the above embodiments should be interpreted relative to an electronic device.

Moreover, the term "configured" as used herein to describe a component, section, or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An electronic device comprising:
a plurality of non-temporary memory components including a predefined memory component;
a connector configured to operatively connect the electronic device to at least one of a first external device and a second external device, the second external device being different type of device from the first external device;
a communication component configured to:
automatically establish communication with the connected external device, the automatically establishing communication with the connected external device including an initial communication process;
determine that the connected external device is the first external device or the second external device based on the communication;
allow the connected external device to recognize only the predefined memory component when the connected external device is determined to be the first external device; and
allow the connected external device to simultaneously recognize all of the non-temporary memory components when the connected external device is determined to be the second external device.

2. The electronic device according to claim 1, further comprising
a display component configured to display a selection screen to allow a user to input a select instruction when the first external device is connected to the electronic device.

3. The electronic device according to claim 1, further comprising
an imaging element configured to create an image data of a subject; and
a data controlling component configured to store the image data in at least one of the plurality of memory components, the data controlling component being further configured to cause the image data to be sent from the at least one of the plurality of memory components to the first external device according to a command sent from the first external device.

4. The electronic device according to claim 1, wherein
at least one of the plurality of memory components is removable from the electronic device.

5. The electronic device according to claim 1, wherein
the initial communication includes:
a notification of connection;
a request for device information after the notification of connection;
a response with device information after the request for device information;
a notification of recognition after the response with device information;
a request for storage information after the notification of recognition; and
a response with storage information.

6. The electronic device according to claim 1, wherein the first external device is incapable of recognizing all of the plurality of memory components simultaneously.

7. A method of connecting an electronic device to an external device, comprising:
- providing the electronic device with a plurality of non-temporary memory components including a predefined memory component;
- connecting the electronic device to at least one of a first external device and a second external device via a connector, the second external device being different type of device from the first external device;
- automatically establishing communication between the electronic device and the connected external device, the automatically establishing communication with the connected external device including an initial communication process;
- determining that the connected external device is the first external device or the second external device based on the communication;
- allowing the connected external device to recognize only the predefined memory component when the connected external device is determined to be the first external device; and
- allowing the connected external device to simultaneously recognize all of the non-temporary memory components when the connected external device is determined to be the second external device.

8. The method according to claim 7, further comprising inputting a select instruction via a display component configured to display a selection screen when the first external device is connected to the electronic device.

9. The method according to claim 7, wherein the automatically establishing of the communication between the electronic device and the connected external device further includes automatically establishing communication between the electronic device and the second external device once the second external device is connected to the electronic device so as to permit the second external device to automatically recognize all of the plurality of memory components simultaneously.

10. The method according to claim 9, wherein the electronic device includes a communication component configured to establish communication between the electronic device and the first external device, and between the electronic device and second external device.

11. The method according to claim 7, further comprising creating an image data of a subject; and
storing the image data in at least one of the plurality of memory components.

12. The method according to claim 11, wherein the creating of the image data includes an imaging element configured to create the image data of the subject, and the storing of the image data includes a data controlling component configured to cause the image data to be sent from the at least one of the plurality of memory components to the first external device according to a command sent from the first external device.

13. The method according to claim 7, wherein the initial communication includes:
- a notification of connection;
- a request for device information after the notification of connection;
- a response with device information after the request for device information;
- a notification of recognition after the response with device information;
- a request for storage information after the notification of recognition; and
- a response with storage information.

14. The method according to claim 7, wherein the first external device is incapable of recognizing all of the plurality of memory components simultaneously.

* * * * *